United States Patent [19]

Chang et al.

[11] Patent Number: 5,547,055
[45] Date of Patent: Aug. 20, 1996

[54] UNIDIRECTIONAL ROLLER BEARING WITH ROLLER RETAINING STRUCTURE

[75] Inventors: Chun-Hsiung Chang, T'ao-Yuan Hsien; I-Heng Chen, T'ao-Yuan, both of Taiwan

[73] Assignee: Chin-Fa Chen, Taipei Hsien, Taiwan

[21] Appl. No.: 371,975

[22] Filed: Jan. 12, 1995

[51] Int. Cl.⁶ .................................................. F16D 41/066
[52] U.S. Cl. ........................... 192/45; 192/64; 188/82.84
[58] Field of Search ................................... 192/45, 64, 38, 192/44; 188/82.84

[56] References Cited

U.S. PATENT DOCUMENTS

| | | | |
|---|---|---|---|
| 3,625,324 | 12/1971 | Scharf | 192/45 |
| 4,735,299 | 4/1988 | Ohuchi | 192/45 |
| 5,211,274 | 5/1993 | Milano, Jr. et al. | 192/45 |

FOREIGN PATENT DOCUMENTS

| | | | |
|---|---|---|---|
| 753388 | 7/1956 | United Kingdom | 192/45 |

*Primary Examiner*—Richard M. Lorence
*Attorney, Agent, or Firm*—Bacon & Thomas

[57] ABSTRACT

A roller bearing consists of a hollow cylindrical main body, two annular locating plates, a plurality of rolling bodies and elastic elements. The cylindrical main body is provided with at least three roller grooves equidistantly and equiangularly spaced and disposed around its interior hollow. Each roller groove is configured to have an elastic element seat arranged at its deeper end. The groove wall around the groove opening connected to the interior hollow of the main body extends and forms a reduced neck portion, which makes the groove opening have a width smaller than the diameter of rolling bodies to keep rolling bodies from dropping out of the groove. On the central area of each end surface of the cylindrical main body is an inner annular portion and between end surfaces of the main body and of the inner annular portions are provided with locating grooves.

12 Claims, 12 Drawing Sheets

UNIDIRECTIONAL ROLLER BEARING WITH ROLLER RETAINING STRUCTURE

BACKGROUND OF THE INVENTION

1. Field of the Invention

The invention relates to a bearing structure capable of preventing rolling bodies from inwardly falling, especially to a creative design of a unidirectional bearing structure which can be used in a bike's free wheel and typical machine and which has the advantages of a simplified construction and low production costs as well as great enhancement in production efficiency. Furthermore, the bearing structure according to the invention is suitable for fully automatic mass production and thus it has also the effects of saving time in assembling work, minimizing manufacturing costs, and increasing its competitive edges in market.

2. Description of the Prior Art

FIG. 1 shows a conventional unidirectional bearing structure in which a rolling body 1 of either a ball or roller type is to run in a roller race 2 and a roller groove 3 to govern relative motions between an inner ring 5 and an outer ring 6 and carry loads and an elastic element 4 seated in the roller groove 3 will make the rolling body 1 urged solely by a force in a specified direction, resulting in a unidirectional driving effect.

Since a conventional unidirectional bearing structure needs a very smooth roll of rolling bodies between an inner and an outer ring, and the inner and the outer rings are to precisely constrain the motion of elastic elements and rolling bodies, it is not easy for the production of inner and outer rings and the fabrication generally adopts roll forming or forging of steel pipes followed by heat treatment. The manufacture of rollers is even more difficult. In general, this process uses steel wires or round steel bars as raw material. The material must be cut by a stamping machine, forged in a die, burred by a grinder, and then shrunk in a drum to specified roundness and smoothness. The product is finally finished by quenching and fine grinding. Thus, the entire processing procedure is onerous and complicated.

Moreover, a conventional unidirectional bearing structure is not adaptable to a full automatic production procedure. This is because the elastic elements used in a conventional structure are helical springs, which are manufactured by an automatic machine but are easily tangled with each other when piled up due to their spiral coils. This makes these elastic elements unable to be aligned and delivered by a vibrator conveyer. They need to be untangled manually before use. This fact makes a conventional unidirectional bearing structure unqualified for automatic production.

A conventional unidirectional driven sprocket wheel used as a bicycle free wheel having a like construction is shown in FIGS. 2 and 3. The sprocket wheel primarily consists of an annular hollow sprocket wheel body 10 having external sprocket teeth 11 formed on the outer surface thereof and internal zigzag teeth 12 disposed around the interior hollow thereof, every two adjacent zigzag teeth forming a detention groove 13 and arched grooves 14 and 14' being respectively disposed on two sides of these zigzag teeth; a shaft bushing 15 having an enlarged stop flange 151 formed at the bottom thereof, an arched groove 155 abutting against the flange 151, a groove 152 and recesses 153 provided on the outer surface of the bushing for housing a resilient ring and detent plates respectively, and external screw threads 154 formed on the stepped cylindrical surface of the bushing; a disk sleeve 16 having an arched groove (not shown) formed on the inside surface thereof and internal screw threads 161 provided on the interior hollow wall thereof for engaging with the external screw threads 154; and a plurality of steel balls 191 residing in grooves between the sprocket wheel body 10 and the shaft sleeve 15 and between the sprocket wheel body 10 and the disk sleeve 16 to maintain a smooth slide between these components.

Two detent plates 17 and 18 are seated in the recesses 153 and rotatably secured there by a resilient ring 19 housed in the groove 152. When a force acts on the tail 171 of detent plates, the front end of detent plates will lift. The sprocket wheel is assembled by mounting the shaft sleeve 15 on the hollow sprocket wheel body 10 and then combining them by fastening the disk sleeve 16 to the shaft sleeve 15.

Some drawbacks reside in the conventional sprocket wheel structure used in a bicycle free wheel unidirectional drive.

1. Such a structure has the same shortcomings of complexity and high production cost as a conventional unidirectional bearing. Besides, two detent plates 17 and 18 and the resilient ring 19 can not be assembled by automatic equipment and thus it is not feasible to lower production costs by means of automation production.
2. When the external sprocket teeth are driven to rotate in a counterclockwise direction, two detent plates 17 and 18 incessantly slide over zigzag teeth 12 and detention grooves 13. Consequently the detent plates will be urged by the resilient ring 19 to give the zigzag teeth a beating, thus producing loud noises.
3. The amount of parts in such a structure is up to seventy-eight, including at least seventy-two steel balls and at least six structural parts. Thus the construction is intricate and the assembling work is time-consuming.

In view of the above-mentioned drawbacks, this invention provides an improved unidirectional bearing structure in which these drawbacks have been eliminated.

SUMMARY OF THE INVENTION

Therefore, the primary object of the invention is to provide a unidirectional bearing having a rolling body inwardly falling protection construction in which the whole structure is simplified and cost-efficient and of which elastic elements are ringlike in shape, which can avoid being tangled when these elastic elements are piled up, and so it has a great suitability for fully automatic integrated mass production to significantly lower production costs and promote competitive advantages in market.

The further object of the invention is to provide a unidirectional bearing having a rolling body inwardly falling protection construction that can operate quietly for use in a bicycle free wheel or a sprocket wheel when the driving shaft seated in the bearing is rotating in an opposite direction.

Another object of the invention is to provide a unidirectional bearing having a rolling body inwardly falling protection construction which has fewer components and simple manufacturing methods and so can acquire easy-to-assemble and timesaving effects.

Another object of the invention is to provide a unidirectional bearing having a rolling body inwardly falling protection construction in which two annular locating plates are attached to a main body by means of locating grooves formed on the walls between the main body and an inner annular portion to prevent dust from falling into bearing interiors, avoiding dirt and elongating its service life as well as having the effects of locating internal parts and averting loosening.

Still another object of the invention is to provide a unidirectional bearing having a rolling body inwardly falling protection construction in which the groove wall around roller groove openings connected to the interior hollow of the main body forms a reduced neck portion with an opening width smaller than roller diameters so that fallings of rolling bodies can be prevented.

To achieve the forgoing objects, a bearing according to this invention mainly includes:

an annular main body having inner annular portions arranged on the upper and lower end surface thereof, which inner annular portions define therebetween a rib portion that has at least three roller grooves equidistantly and equiangularly spaced and disposed thereon to form through grooves penetrating through the rib portion, which grooves each has a groove bottom of varying depth and has an elastic element seat integrally formed at the end near the deeper side and an opening connected to the interior hollow of the main body, the wall around which opening extends and forms a reduced neck portion at the opening and which opening has a width smaller than the diameter of rolling bodies so as to prevent rolling bodies from dropping out of the grooves;

a plurality of rolling bodies either of a ball or a roller type, each having an appropriate diameter and a smooth surface;

a plurality of elastic elements having an elastic restoring capability when compressed and being made of a curled thin sheet; and two locating annular plates each having a rim engageable with locating grooves between the end surfaces of the main body and of inner annular portions to secure the locating annular plate on the top of the inner annular portion.

The bearing is assembled by placing rolling bodies and elastic elements into roller grooves and elastic element seats respectively and then attaching two locating annular plates to the main body by means of an engagement with the locating grooves arranged between the end surfaces of the main body and of the inner annular portions.

The detailed structure, applied principles, features, as well as other advantages of the present invention will become apparent from the following detailed description of preferred embodiments when read with reference to the accompanying drawings.

DESCRIPTION OF THE PREFERRED EMBODIMENTS

Figure 1:
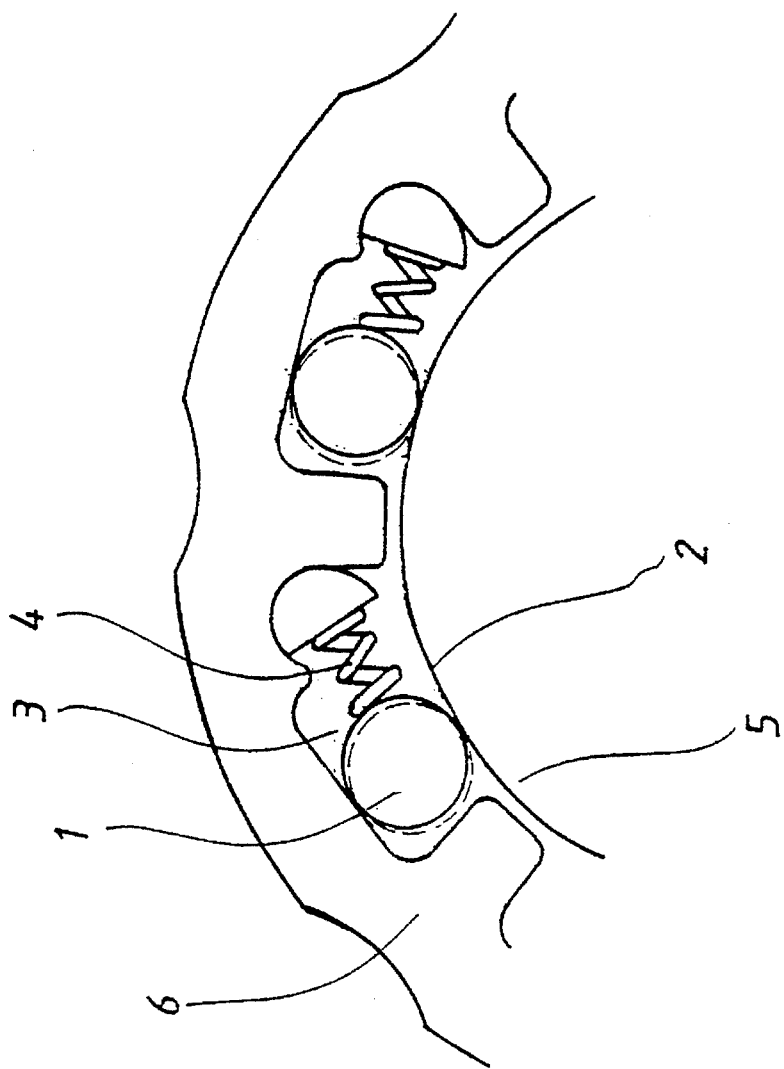
FIG. 1 is a partial side cross sectional view showing a conventional unidirectional bearing structure.
Figure 2:
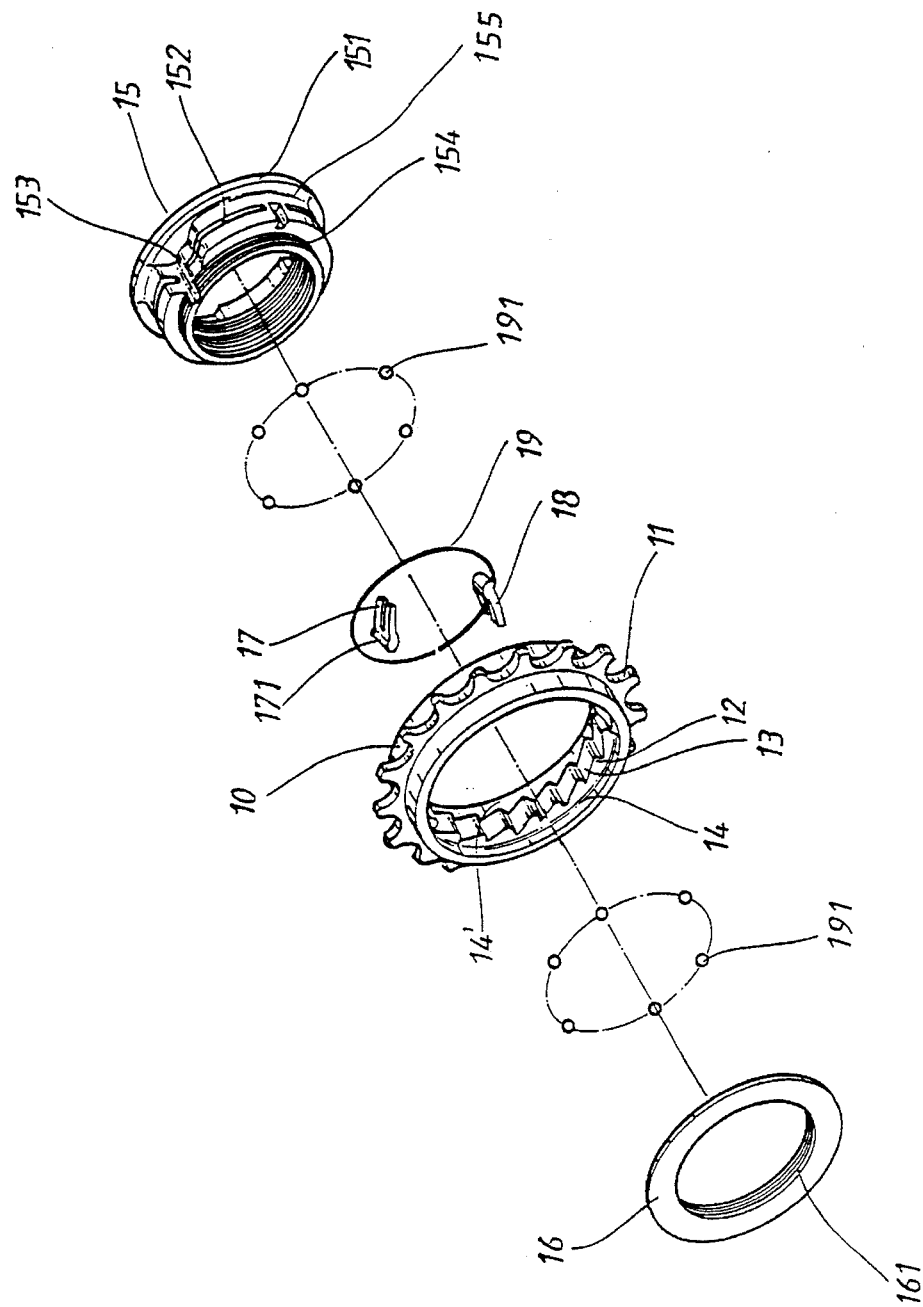
FIG. 2 is an exploded view of a conventional bicycle free wheel structure.
Figure 3:
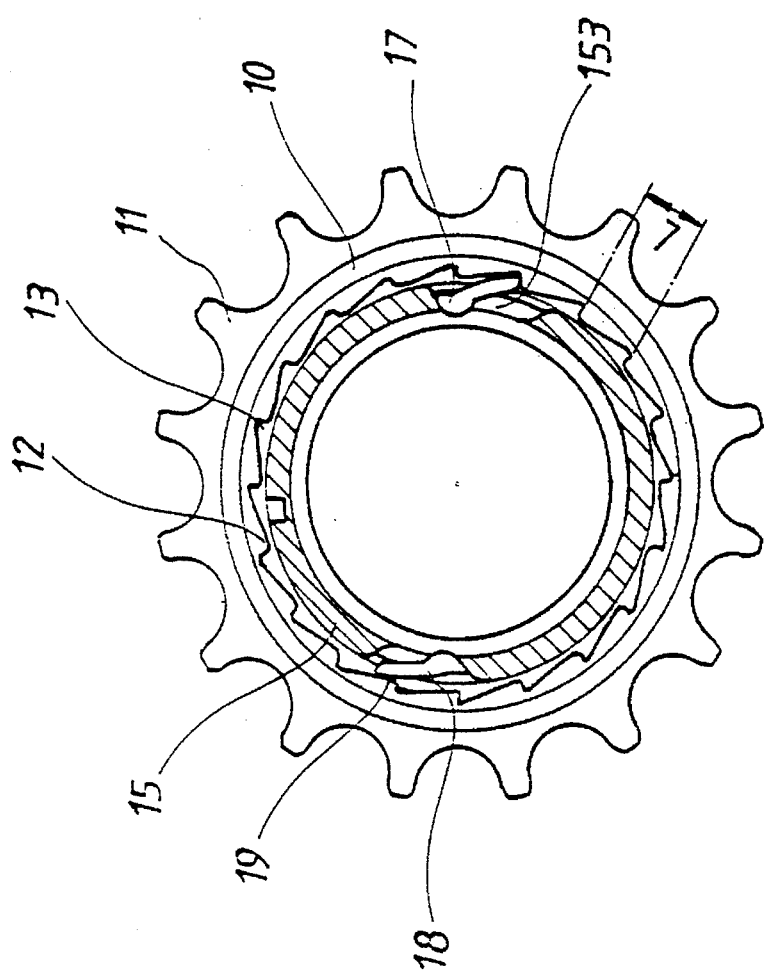
FIG. 3 is a schematic side view showing the structure of the conventional free wheel of FIG. 2 in an assembled state.

FIGS. 1 to 3 show a conventional unidirectional bearing of which the structure and drawbacks have been discussed above and thus will not be detailed again.

Figure 4:
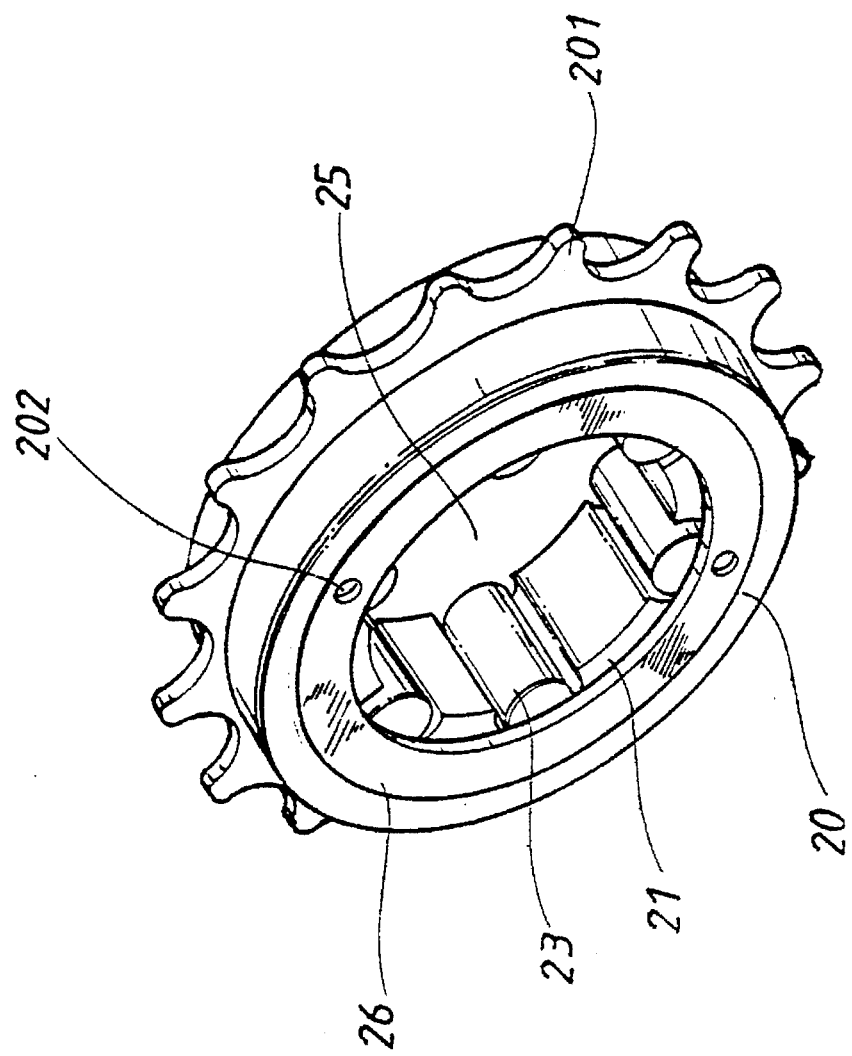
FIG. 4 is a perspective view showing a preferred embodiment of a bearing according to this invention.
Figure 5:
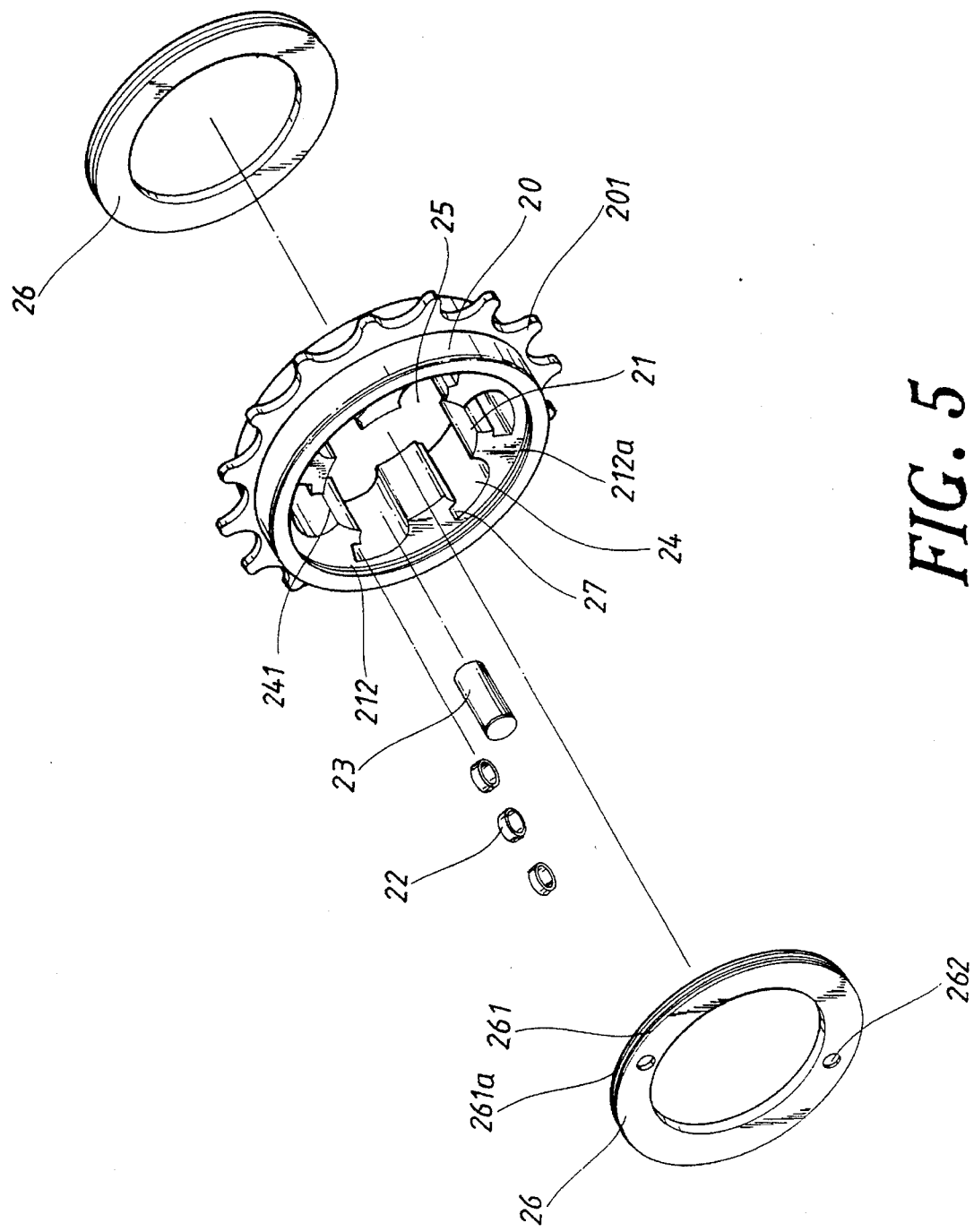
FIG. 5 is an exploded view of the embodiment of a bearing shown in FIG. 4.
Figure 8:
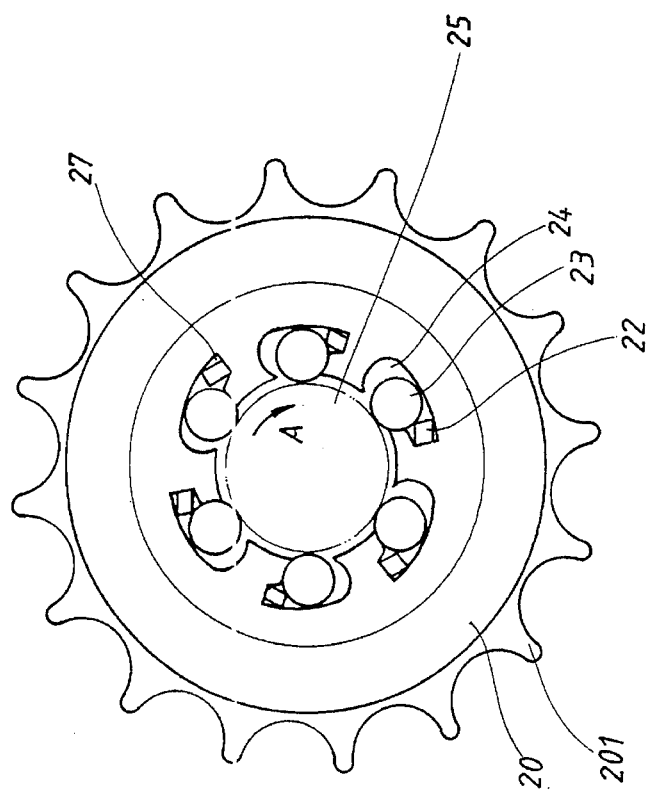
FIG. 8 is a side cross sectional view of the embodiment of a bearing of this invention in an assembled state, illustrating that the bearing components will not be driven to move when a shaft supported by the bearing rotates in a clockwise direction.
Figure 13:
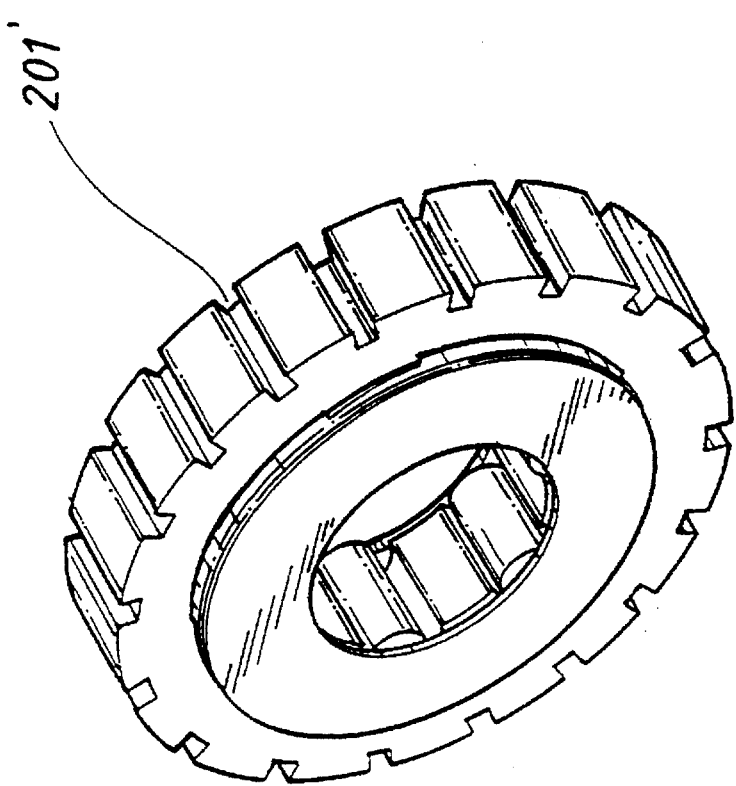
FIG. 13 is a perspective view showing the outer appearance of another embodiment of a bearing of the invention.
Figure 14:
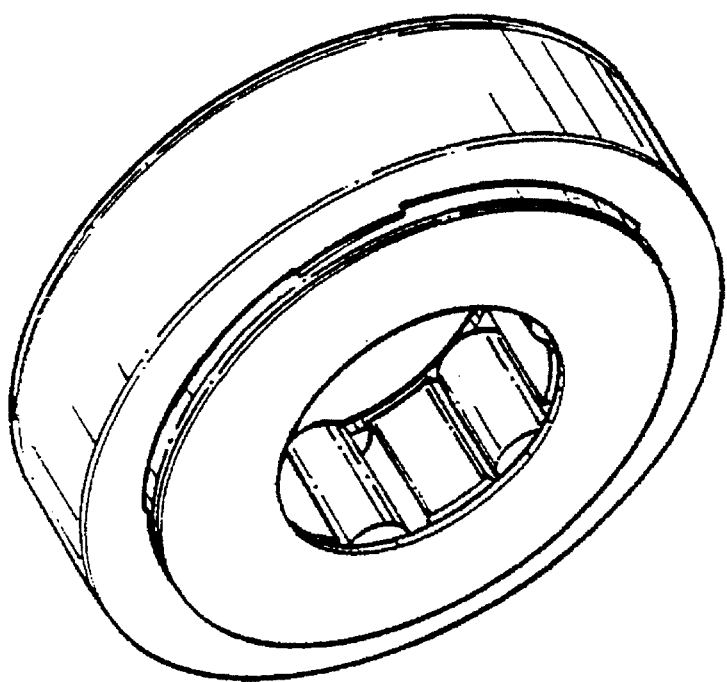
FIG. 14 is a perspective view showing the outer appearance of another embodiment of a bearing of the invention.

Referring to FIGS. 4 and 5, an embodiment of a bearing according to this invention mainly includes an annular main body 20, a plurality of elastic elements 22 and rolling bodies 23, and locating annular plates 26. The annular main body 20 is provided with a recessed inner annular portion 21 on its upper and lower end surfaces. The wall around the inner annular portion 21 is equipped with locating grooves 212 which have internal screw threads 212a engageable with external screw threads 261a formed on locating annular plates 26. Between two inner annular portions is a rib portion with at least three roller grooves 24 equidistantly and equiangularly spaced and disposed on the interior hollow circumference of the main body, forming through grooves extending from one side to the other. As shown in FIG. 8, each roller groove is characterized in that the groove wall 241 around a groove opening connected to the interior hollow 25 of the annular main body 20 extends and forms a reduced neck portion at the groove opening, which makes the groove opening have a width smaller than the diameter of the rolling bodies to prevent rolling bodies from falling, and in that the depth of the groove bottom varies from one end to the other. The roller groove 24 is provided with an elastic element seat 27 at its deeper end. Further, on the outer wall surface of the annular main body can be external sprocket teeth 201 for use as a bicycle's free wheel, or be key slots 201' as shown in FIG. 13, or be a smooth surface as shown in FIG. 14 for use in typical mechanical linkage.

The elastic element 22 may be made of a curled thin sheet having a split seam or of a closed shape to provide elastic restoring forces as it sustains a radial compression force.

The rolling body 23 has an outer smooth cylindrical surface and can be placed into roller grooves 24.

Two locating annular plates 26 are each provided with an annular flat body, locating holes 282 disposed on its outside planar faces and external screw threads formed on its outer rim.

Figure 10:
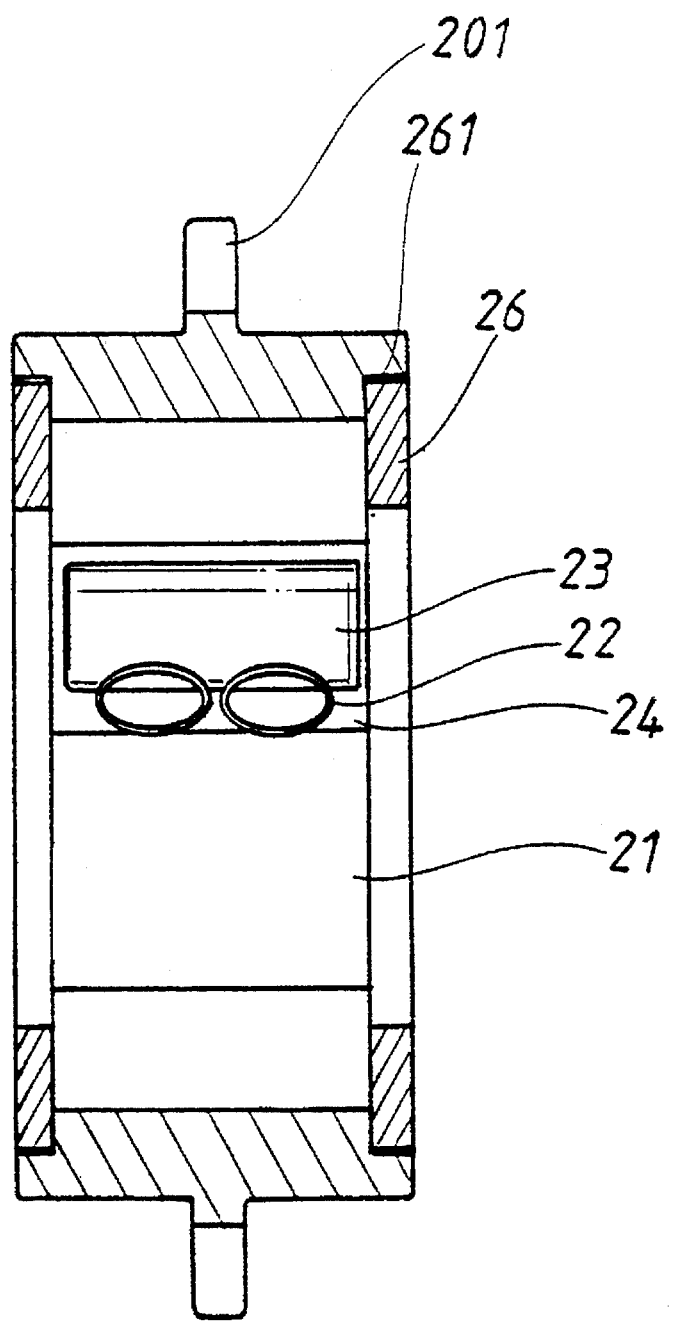
FIG. 10 is a cross sectional view along the axial direction of a bearing, showing the internal construction of an embodiment of a bearing according to this invention.

Now referring to FIGS. 8 and 10, the embodiment of a bearing according to this invention is assembled by placing rolling bodies 23 and elastic elements 22 into roller grooves 24 and elastic element seats 27 respectively and then firmly securing two locating annular plates 26 on the top of inner annular portions by means of a screw thread engagement with the locating grooves 212.

Figure 6:
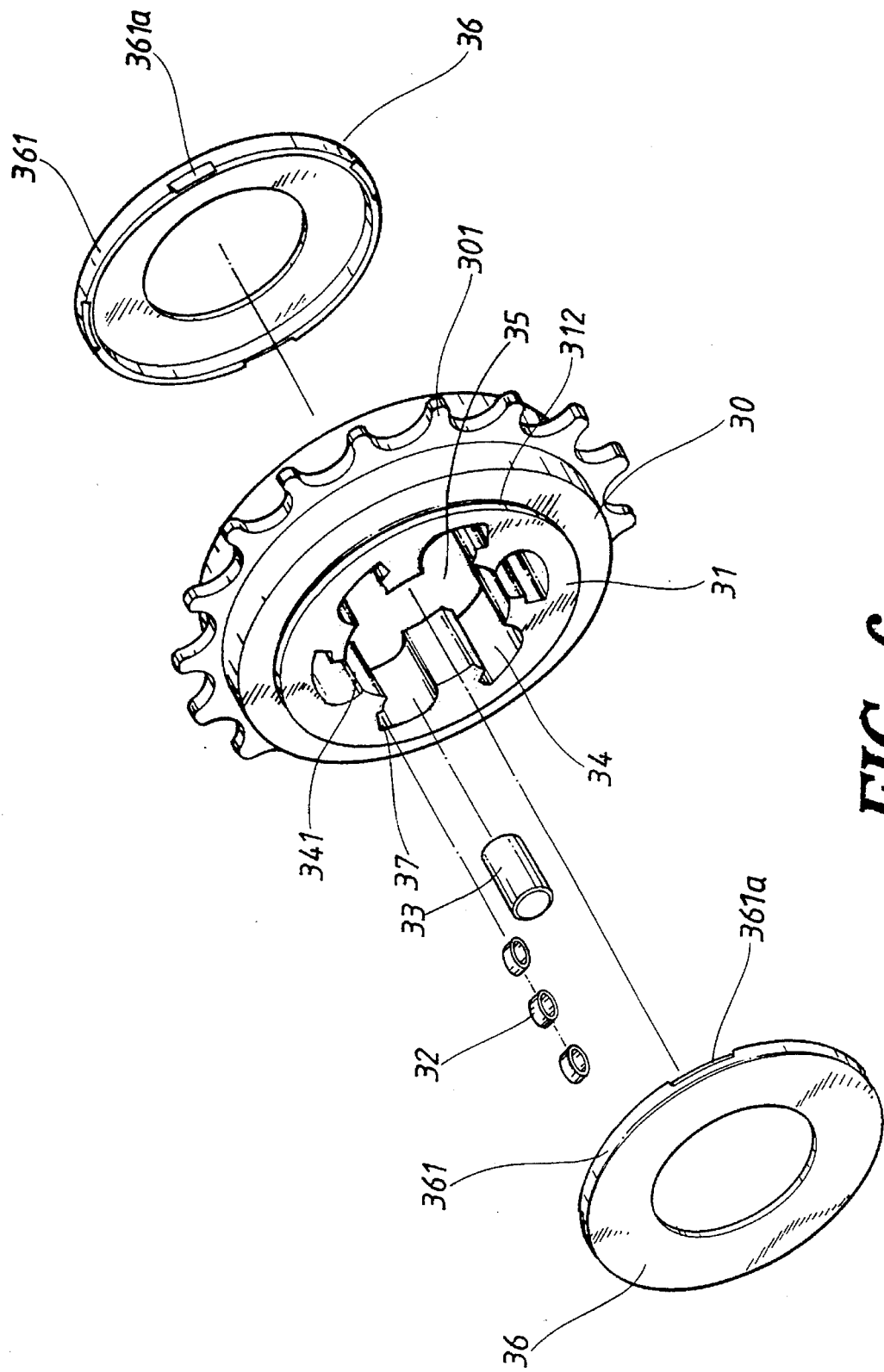
FIG. 6 is an exploded view of another embodiment of a bearing according to the invention.
Figure 11:
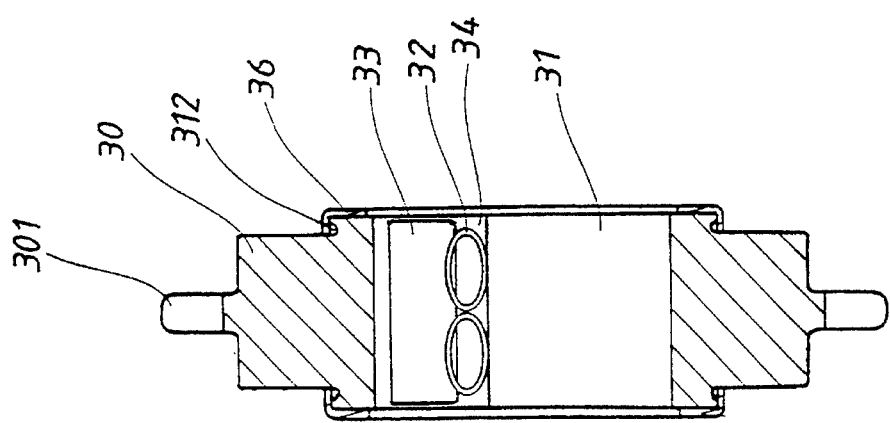
FIG. 11 is an axial cross sectional view showing another embodiment of a bearing according to the invention.

FIGS. 6 and 11 show another embodiment of a bearing of this invention. It can be seen from these drawings that the bearing structure of this invention chiefly consists of an annular main body 30, a plurality of elastic elements 32 and rolling bodies 33, and locating annular plates 36. The annular main body 30 is provided with a raised inner annular portion 31 on each of its upper and lower end surfaces. The cylindrical surface of the inner annular portion 31 projecting above the main body 30 is equipped with locating grooves 312 for an engagement with locating annular plates 36. Between two inner annular portions is a rib portion with at least three roller grooves 34 equidistantly and equiangularly spaced and disposed on the interior hollow circumference of the main body, forming through grooves extending from one side to the other. Each roller groove is characterized in that the groove wall 341 around a groove opening connected to the interior hollow 35 of the annular main body 30 extends and forms a reduced neck portion at the groove opening, which makes the groove opening have a width smaller than the diameter of the rolling bodies to prevent rolling bodies from falling, and in that the depth of the groove bottom varies from one end to the other. The roller groove 34 is provided with an elastic element seat 37 at its deeper end. Further, on the outer wall surface of the annular main body can be external sprocket teeth 301 for use as a bicycle's free wheel, or be key slots 201' as shown in FIG. 13, or be a smooth surface as shown in FIG. 14 for use in typical mechanical linkage.

The elastic element 32 may be made of a curled thin sheet having a split seam or of a closed shape to provide spring restoring forces as it sustains a radial compression force.

The rolling body 33 has an outer smooth cylindrical surface and can be placed into roller grooves 34.

Two locating annular plates 36 are each provided on its outer rims 361 with a retaining means 361a for an engagement with locating grooves 312 when it is mounted on the main body.

The embodiment of a bearing of this invention is built in the following manner. Rolling bodies 33 and elastic elements 32 are first placed into roller grooves 34 and elastic element seats 37 respectively, and then mount locating annular plates 36 on the top of the inner annular portions by an engagement with locating grooves 312.

Figure 7:
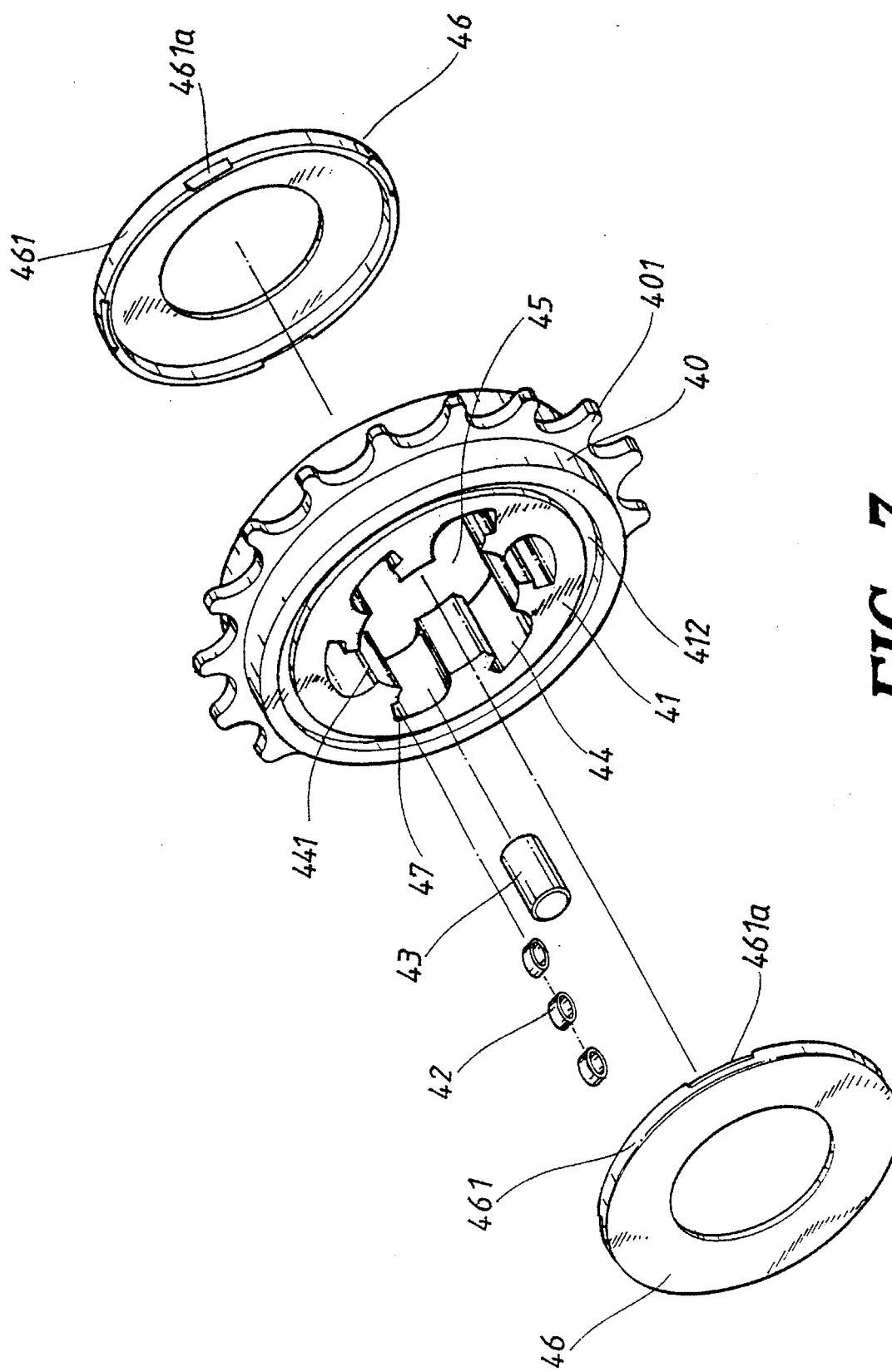
FIG. 7 is an exploded view of another embodiment of a bearing of this invention.
Figure 12:
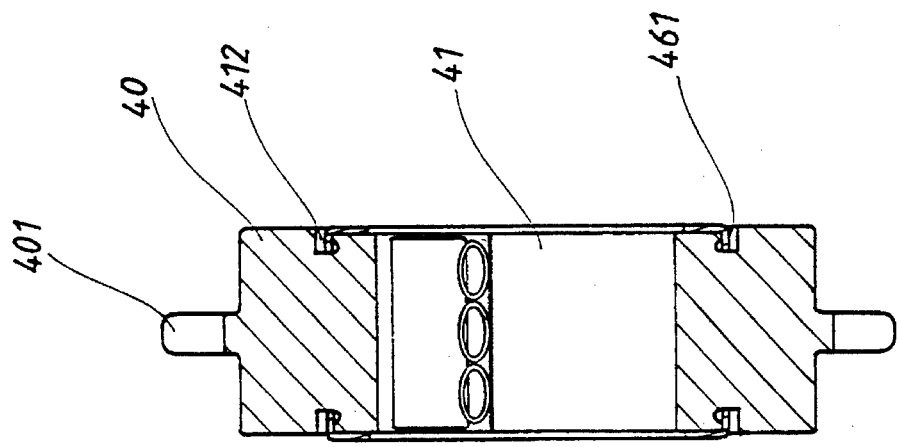
FIG. 12 is also an axial cross sectional view showing another embodiment of a bearing of the invention.

FIGS. 7 and 12 show another embodiment of the invention, in which at appropriate positions between end surfaces of an annular main body 40 and of an inner annular portion 41 are formed locating grooves 412 engageable with the rim 461 of a locating annular plate. The configuration of the main body 40 of this embodiment is the same as that of the main body 30 described above except locating grooves.

As indicated in FIG. 8, when a driving shaft seated in the interior hollow 25 of a unidirectional bearing according to the invention rotates in the clockwise direction, rolling bodies 23 will move toward the deeper end of roller grooves and further compress elastic elements 22 and thus the shaft will be unable to drive the annular main body 20 to rotate.

Figure 9:
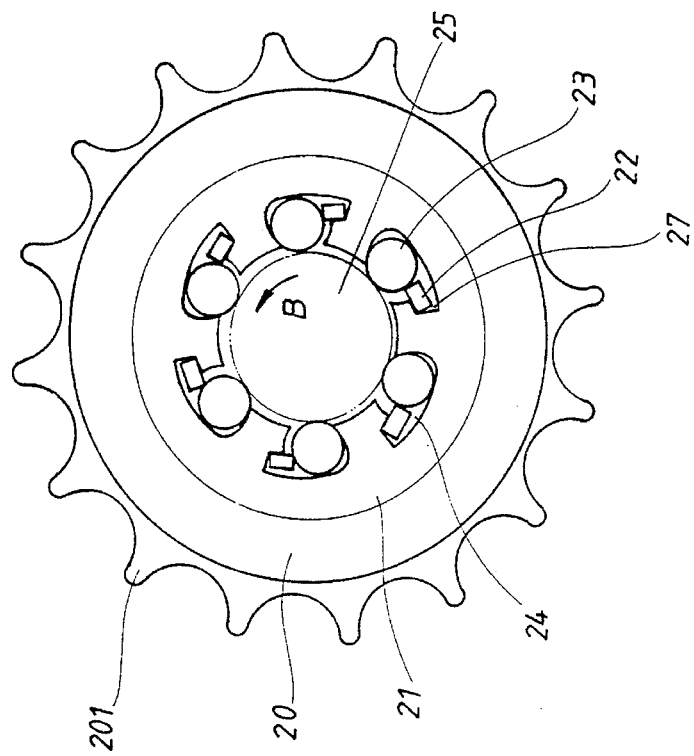
FIG. 9 is also a side cross sectional view of the bearing of FIG. 8, explaining that the bearing components will move along with a shaft rotation when the shaft seated in the bearing rotates in a counterclockwise direction.

On the contrary, when the shaft rotates in the counter-clockwise direction as shown in FIG. 9, the rolling bodies 23 are urged by elastic elements 22 to move to the shallow end of the roller grooves and finally stopped by the side wall of the grooves, resulting in an engagement effect between the shaft and the main body so that the shaft can drive the main body to rotate.

The invention, therefore, allows parts of a minimal number in a bearing structure, provides an improved bearing structure which is not only easier to produce but also suitable for a fully automatic manufacturing procedure, and can realize the objects of saving assembling work time and production costs, and increasing the service life of a bearing. It is doubtless a cost effective design and a new and useful invention.

What is claimed is:

1. A unidirectional roller bearing comprising an annular main body, a plurality of rolling bodies, a plurality of elastic elements, and two locating annular plates; wherein said annular main body has an interior hollow portion which is provided with at least three roller grooves equidistantly and equiangularly spaced therearound, which roller grooves each has a bottom of varying depth and a groove opening connected to the interior hollow portion of said main body and a groove wall extending around the opening and forming a reduced neck portion defining an opening having a width that is smaller than the outside diameter of said rolling bodies to prevent said rolling bodies from dropping out of the grooves and each roller groove includes a deeper end, and further has an elastic element seat arranged at the deeper end;

said annular main body having an upper end surface, a lower end surface, an inner annular portion formed on a central area of each end surface and a plurality of locating grooves arranged between the end surfaces of said main body and said inner annular portions to engage with said locating annular plates and prevent said rolling bodies from dropping out;

each of said rolling bodies having an appropriate outside diameter that is larger than the width of said roller groove openings;

each of said elastic elements having a resilient restoring capability when compressed;

said locating annular plates preventing said rolling bodies and said elastic elements from escaping from their positions; and said rolling bodies and said elastic elements are individually placed in corresponding said roller grooves and said elastic element seats and said two locating annular plates are attached to two ends of said annular main body by an engagement with said locating grooves.

2. A unidirectional bearing as claimed in claim 1, wherein said inner annular portion is a recess formed on each end surface of said annular main body and each said locating grooves includes an internal screw thread formed thereon, the internal screw threads being arranged on the interior wall around said recess to engage with a plurality of external screw threads formed on said locating annular plates.

3. A unidirectional bearing as claimed in claim 1, wherein said inner annular portion is a raised area formed on the end surfaces of said annular main body and said locating grooves are arranged on a cylindrical surface of said inner annular portion projecting above said main body for engagement with a retaining means disposed on a rim of said locating annular plates.

4. A unidirectional beating as claimed in claim 1, wherein said locating groove is formed between the end surfaces of said inner annular portions and said annular main body to engage with a retaining means on a rim of the locating annular plates.

5. A unidirectional bearing as claimed in claim 1, wherein said elastic elements are made of a curled thin sheet.

6. A unidirectional bearing as claimed in claim 1, wherein said elastic elements are made of a curled thin sheet of an entirely closed shape.

7. A unidirectional bearing as claimed in claim 1, wherein said elastic elements are made of a curled thin sheet having a split seam.

8. A unidirectional bearing as claimed in claim 1, wherein the outer cylindrical surface of said annular main body is provided with external sprocket teeth for use as a bicycle free wheel.

9. A unidirectional bearing as claimed in claim 1, wherein the outer cylindrical surface of said annular main body is provided with a plurality of key slots for engaging a mechanical linkage.

10. A unidirectional bearing as claimed in claim 1, wherein the outer cylindrical surface of said annular main body is a smooth surface.

11. A unidirectional bearing as claimed in claim 1, wherein said locating annular plate includes a rim and is provided with at least three retaining means on the rim.

12. A unidirectional bearing as claimed in claim 1, wherein said locating annular plate includes an outer rim for forming a retaining means.

* * * * *